United States Patent
Goddard, Jr.

(10) Patent No.: US 12,211,232 B1
(45) Date of Patent: Jan. 28, 2025

(54) SYSTEM FOR NON-INVASIVE PET HEAD-MOTION CORRECTION THROUGH OPTICAL 3D POSE TRACKING

(71) Applicant: MTRADE, LLC, Oxford, MS (US)

(72) Inventor: James Samuel Goddard, Jr., Knoxville, TN (US)

(*) Notice: Subject to any disclaimer, the term of this patent is extended or adjusted under 35 U.S.C. 154(b) by 219 days.

(21) Appl. No.: 17/517,553

(22) Filed: Nov. 2, 2021

Related U.S. Application Data

(60) Provisional application No. 63/108,465, filed on Nov. 2, 2020.

(51) Int. Cl.
  *G06T 7/73* (2017.01)
  *G06T 7/33* (2017.01)
  *G06T 7/55* (2017.01)
  *G06V 40/16* (2022.01)

(52) U.S. Cl.
  CPC .......... *G06T 7/73* (2017.01); *G06T 7/337* (2017.01); *G06T 7/55* (2017.01); *G06V 40/171* (2022.01); *G06T 2207/10028* (2013.01); *G06T 2207/10104* (2013.01)

(58) Field of Classification Search
  CPC .. G06T 7/73; G06T 7/55; G06T 7/337; G06T 2207/10028; G06T 2207/10104; G06V 40/171
  See application file for complete search history.

(56) References Cited

U.S. PATENT DOCUMENTS

| | | | |
|---|---|---|---|
| 11,648,418 B2* | 5/2023 | Owens | A61N 5/1067 378/65 |
| 2016/0073993 A1* | 3/2016 | Ouyang | A61B 5/0035 600/411 |
| 2017/0238897 A1* | 8/2017 | Siewerdsen | A61B 6/466 |
| 2017/0319143 A1* | 11/2017 | Yu | A61B 5/682 |

* cited by examiner

*Primary Examiner* — Chan S Park
*Assistant Examiner* — D J Dhooge
(74) *Attorney, Agent, or Firm* — Wayne Edward Ramage; Baker Donelson

(57) ABSTRACT

A data-driven method and system using optical tracking of natural facial features for quick and accurate pose determination during scanning using one or more cameras installed within or on a PET-CT gantry. No patient preparation, fixtures, or artificial features are needed. The pose data is analyzed and incorporated iteratively in reconstruction for reconstruction to motion correct the PET data. The present invention thus results in improved correction of blurring and artifacts caused by head motion during the PET scan.

7 Claims, 5 Drawing Sheets

SYSTEM FOR NON-INVASIVE PET HEAD-MOTION CORRECTION THROUGH OPTICAL 3D POSE TRACKING

This application claims benefit of and priority to U.S. Provisional Application No. 63/108,465, filed Nov. 2, 2020, the complete disclosure of which, including appendices, is incorporated herein in its entirety by specific reference for all purposes.

FIELD OF INVENTION

This invention relates to a system and methods for correcting for movement of the head in PET brain scanning using optical pose tracking of natural facial features.

BACKGROUND OF INVENTION

Subject motion is a long-standing problem in PET (positron emission tomography) imaging. Positron emission tomography (PET) is an imaging technique that uses radioactive substances (i.e., radiotracers) to visualize and measure changes in metabolic processes and various physiological activities, including, but not limited to, blood flow, regional chemical composition, and absorption. PET scans typically require extended imaging times, ranging from tens of minutes to hours. Brain imaging in particular presents difficult challenges. Clinical patients are often scanned for indications that affect cognition, such as neurodegenerative diseases and neoplasms; however, these patients often cannot follow instructions. Patients with movement disorders intrinsically have difficulty in maintaining stillness. Research studies with labeled neuroligands pose motion problems related to the extended durations of such scans.

The steady advances in PET instrumentation have both positive and negative impacts on the motion problem. The increased sensitivity of modern scanners allows reduction in clinical scan times, reducing the impact of patient head motion. However, the increased spatial resolution makes the impact of even small motions more important. For research studies with neuroligands, scan times are determined by the by the kinetics of the tracers so that improved spatial resolution of the newer scanners can be negated by significant motion. The importance of effective motion correction is greater for such studies.

A number of strategies have been employed to limit or correct for head motion in PET. Various kinds of head restraints have been used. The difficulty with restraints is that they make subjects uncomfortable, especially for long scans, and can themselves cause additional motion. A widely used method is optical tracking of a target attached to the subject's head to determine pose. The difficulty with this method is the time and effort, not always successful, in securely attaching the target. Marker-based optical devices for tracking are difficult to attach rigidly. In addition, such methods often require multiple images, are highly computation-intensive, and there are difficulties related to lines of response (LOR) that fall out of or into the scanner. An alternative method, which does not use instrumentation, is determination of motion parameters by co-registration of each PET image to a reference image, such as a mean PET scan or an MR image. However, this method cannot be applied to time scales of minutes, which are typical of subject motion. For some tracers, the PET image evolves significantly with time and may be sufficiently different from the reference CT (computed tomography) or mean PET image that co-registration is inaccurate.

Accordingly, what is needed is an improved method for non-invasive tracking and correcting for head motion in PET scanning.

SUMMARY OF INVENTION

In various exemplary embodiments, the present invention comprises a method using optical tracking of natural facial features for quick and accurate pose determination during scanning using one or more cameras installed within or on the gantry. No patient preparation, fixtures, or artificial features are needed. The pose data is analyzed and incorporated iteratively in reconstruction for reconstruction to motion correct the PET data. The present invention thus results in improved correction of blurring and artifacts caused by head motion.

DETAILED DESCRIPTION OF EXEMPLARY EMBODIMENTS

Figure 1:
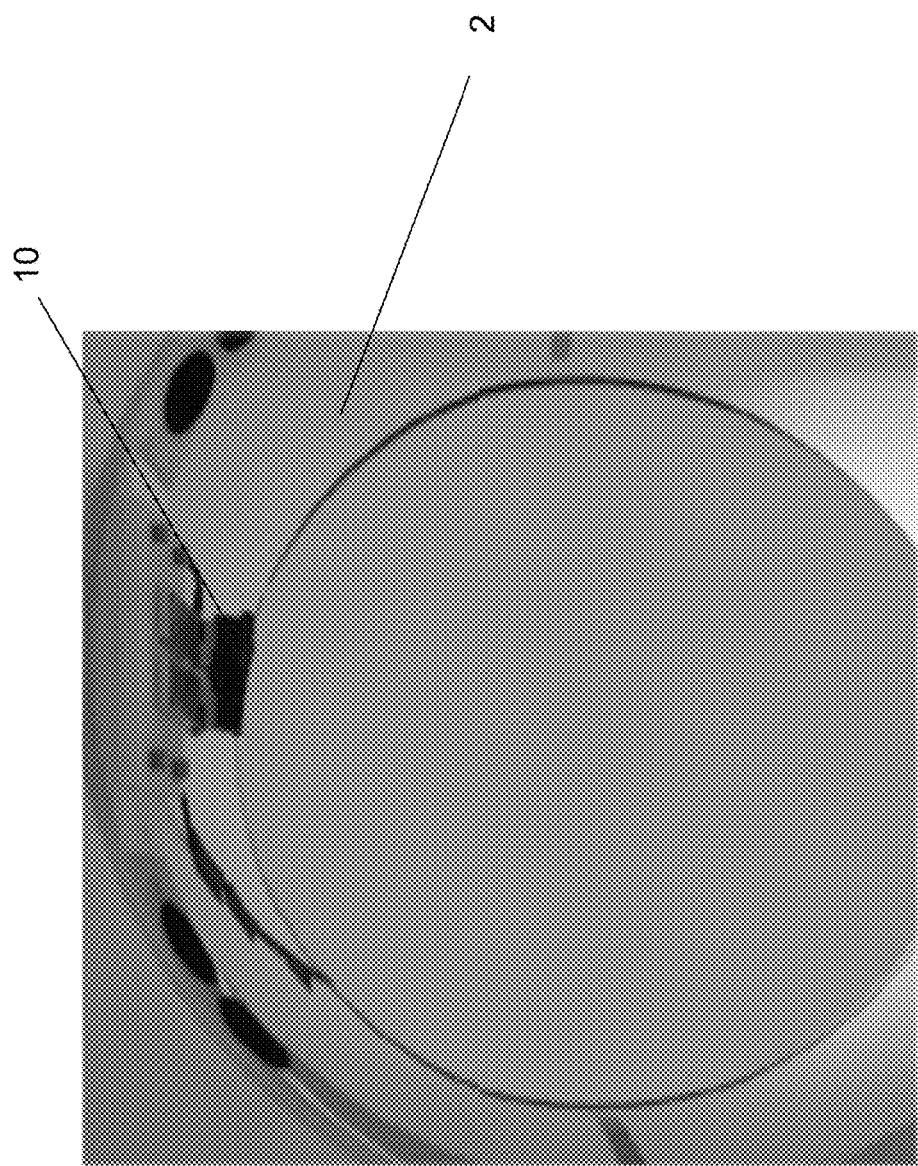
FIG. 1 shows a scanning device with a compact commercial stereo camera.
Figure 2:
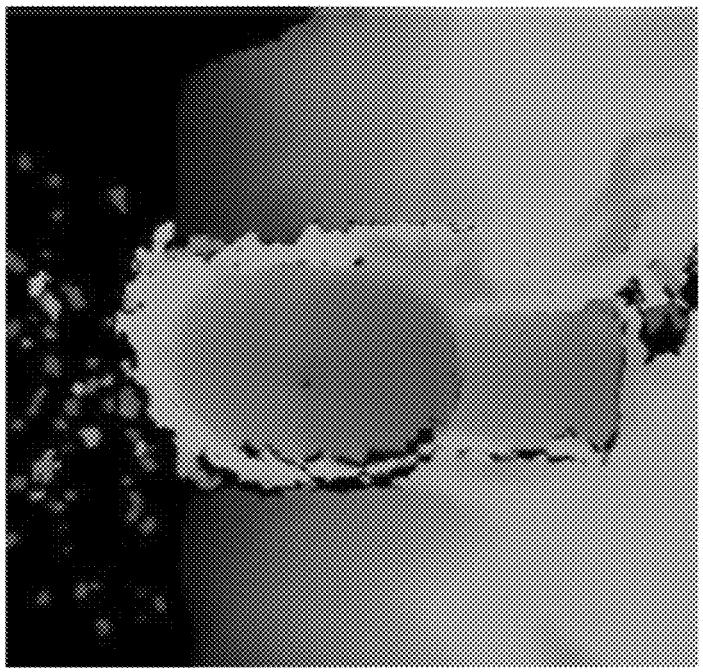
FIG. 2 shows an example of a manikin head with a PET image.
Figure 2:

In various exemplary embodiments, the present invention comprises a method using optical tracking of natural facial features for quick and accurate pose determination during scanning using one or more cameras installed within or on the gantry. The pose data is analyzed and incorporated iteratively in reconstruction for reconstruction to motion correct the PET data. The present invention thus results in improved correction of blurring and artifacts caused by head motion.

In several embodiments, the present method tracks 3D facial features optically to determine pose using one or more compact stereo cameras unobtrusively installed within the PET-CT gantry. No patient prep, fixtures, or artificial features are needed. In contrast to prior art methods, only a single frame is needed to extract 3D structure.

In additional embodiments, the present invention comprises a method for motion correction in PET-CT brain scanning that relies on optical pose tracking of natural facial features and multiframe image reconstruction. No fixtures or markers are affixed to the subject. At least compact stereo camera is mounted within the bore of the PET-CT scanner (such as a Siemens Biograph mCT PET-CT scanner). Images are acquired at 6-30 frames/sec. Scanner acquisition start and stop times are recorded to achieve synchronization between the scanner list file and image pose sequence. Face detection is used to locate head regions for 3D measurement. Pose tracking is performed to an initial reference frame.

3D measurements of head features are made for each camera frame at 6-30 per second. These 3D points are compared to an early reference frame or CT scan to calculate relative pose as a function of time. Optimum head location is determined by facial feature detection. Pose error is not cumulative while being insensitive to facial movements (e.g., mouth, eyes, facial contortions) independent of the overall head motion. Cross calibration between the stereo camera and the PET coordinate frame is performed to calculate the camera-to-PET-CT 3D transformation. An example of the pose alignment for a human study is given where an unaligned pair of 3D views is shown on the left along with the aligned view on the right.

A TTL level signal from the PET gantry is used to synchronize the PC to the times at which PET scanning starts and stops. Image reconstruction may be then performed using the method of Hong et al. (Hong I., Burbar Z., Michel C., "Comparisons Motion Correction Methods for PET Studies," 2012 IEEE Nuclear Science Symposium and Medical Imaging Conference Record, M17-2, p. 3293, which is incorporated herein in its entirety by specific reference for all purposes), where motion correction is applied iteratively within the reconstruction (see Eq. 5). The list mode data are binned into a sequence of sinograms, and the mean pose data for the corresponding intervals are specified.

The pose data, in the form of a 4-dimensional rotation-translation matrix, are analyzed to identify quiescent intervals in which the pose x y z translations vary less than 1 mm rms and the pose Euler angles vary less than 0.1 degrees. Reconstruction is accomplished by dividing the scan into a sequence of sinograms with acceptable motion and incorporating the pose information iteratively in the reconstruction. Manikin studies with attached point sources demonstrate that repositioning is achieved with rms uncertainty <0.5 mm. Human subject studies demonstrate repositioning to ~1.0 mm rms.

In one exemplary embodiment, a method and related system acquires images of the subject's head on a Biograph mCT Flow 64-4R PET/CT system (Siemens Medical Solutions USA, Inc.) at a single bed position. The PET data consists of 109 planes separated by 2.027 mm. As seen in FIG. 1, a camera is mounted within the PET gantry, interfaced to a PC. In some embodiments, as discussed below, multiple cameras may be used. A LabJack interfaced to the PC receives the scanner TTL pulses signifying acquisition start-stop for data synchronization. A CT scan of the subject's head is performed, followed by a PET scan of 1-16 10-minute frames depending upon the protocol. Stereo optical images are recorded at 6/sec for the scan duration. The subject's head is visualized by the optical camera when in the PET position. The camera is connected to a PC by USB (or other wired connection) and controlled by the camera SDK and control software. FIG. 1 shows the camera mounted inside the scanner bore looking towards the PET detectors from the CT side.

Color and depth images are acquired at a maximum rate of 30/sec. A TTL level signal from the PET gantry is interfaced to the PC. The signal is low when the scanner is acquiring data. This signal is used to synchronize the PC to the times at which PET scanning starts and stops. For testing and development purposes, the image data during the scan are recorded and then post-processed to extract the pose measurements.

Intercalibration of the PET and stereo camera coordinate systems is achieved by scanning a calibration target in the scanner CT position and then optically imaging it with the stereo camera in the scanner PET position, relying on the known scanner CT-PET coordinate transformation. The target coordinates for both images are found using MATLAB scripts. The CT coordinates referred to the centered PET frame and the optical coordinates are coregistered to provide the transformation between the two frames.

Figure 3:
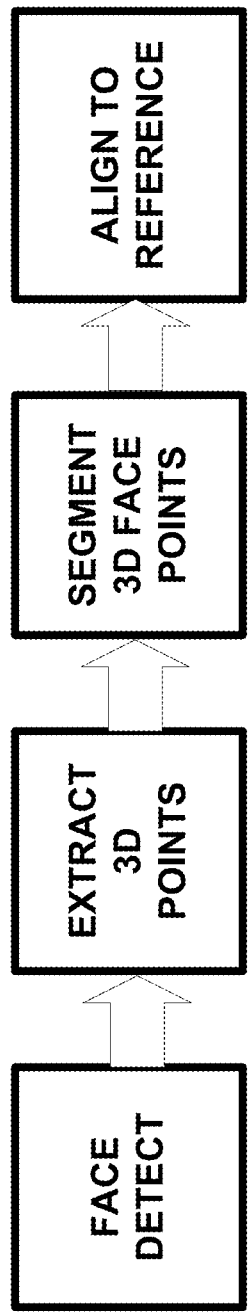
FIG. 3 shows a diagram of a method for correcting the PET image for head-motion.

FIG. 3 shows an example of the process flow for calculating the pose change relative to the reference. Facial features are used to segment the 3D points corresponding to these regions. Point clouds are extracted from the optical depth images. A reference head segmentation is initially selected. In one option, the reference is selected from the beginning of the PET scan. A second option extracts the reference from the CT scan. Then all subsequent images are aligned to this reference. Alignment is performed using a modified iterative closest point (ICP) algorithm that calculates the optimum 6 degrees of freedom pose that aligns the current image to the reference. The transformation between the optical camera and the PET frame is then applied to the poses to obtain centered PET-frame poses. The pose information, consisting of a 4-dimensional rotation-translation matrix at ⅙ sec intervals, is then available for use in image reconstruction.

Figure 4:
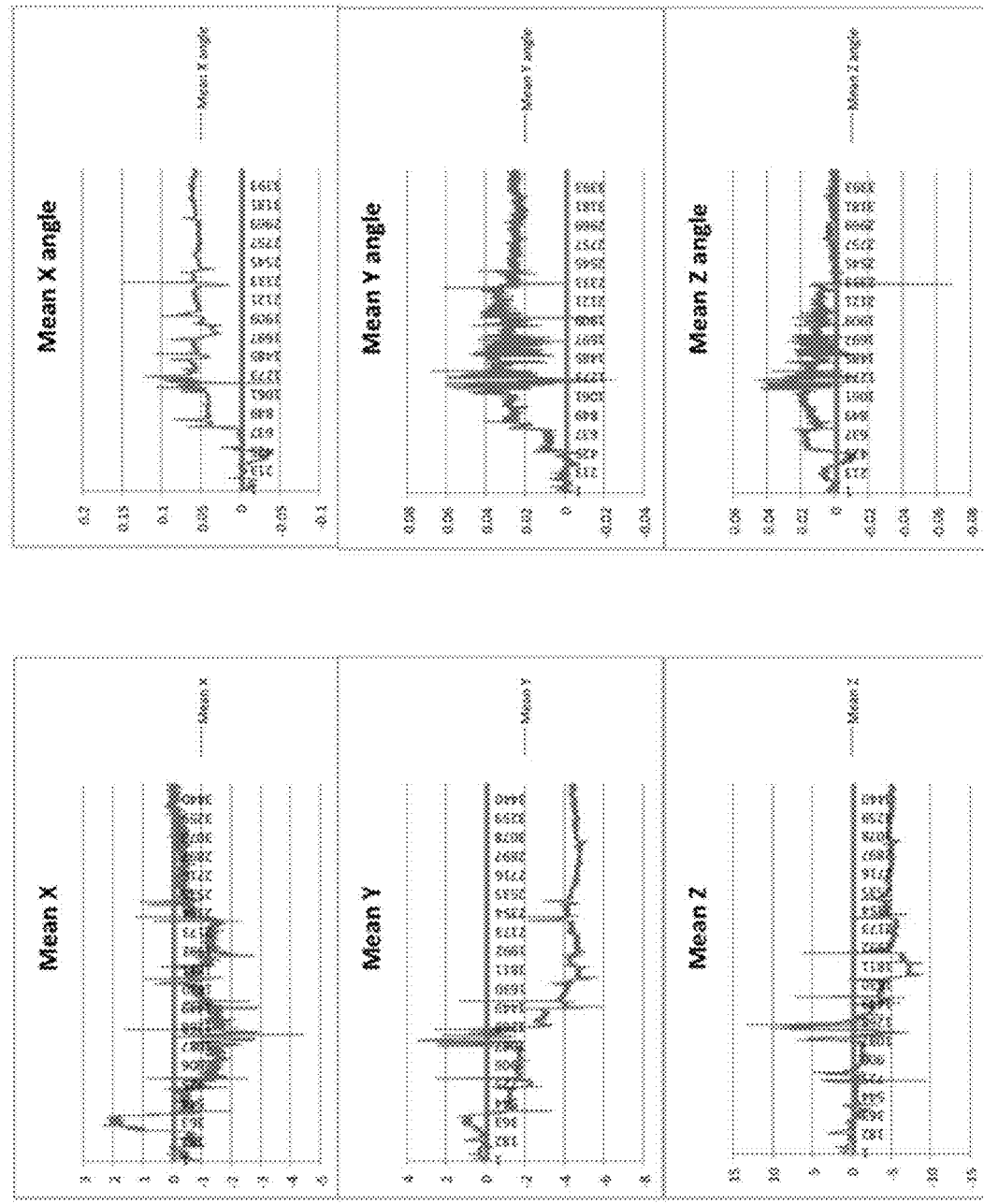
FIG. 4 shows qualitative results of the present invention from a manikin study.

FIGS. 4A and 4B show examples of pose alignment for a human study. FIG. 4A shows a point-cloud view of unaligned point clouds 42, while FIG. 4B shows a point-cloud view of aligned point clouds 44.

Figure 5:
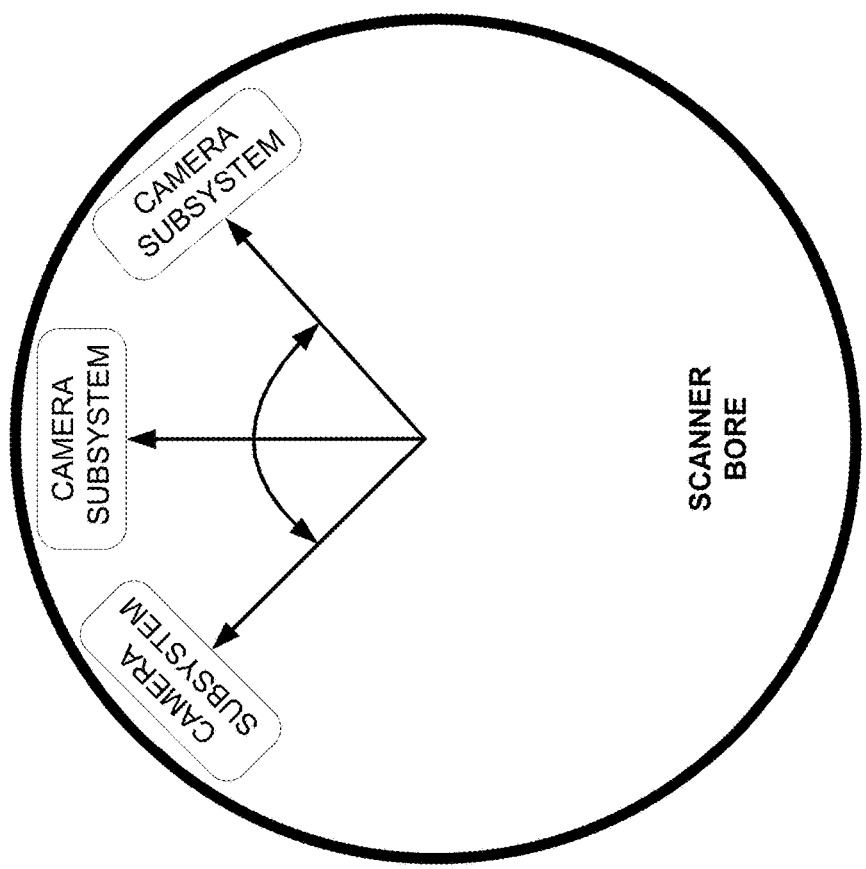
FIG. 5 shows a diagram of a multi-camera embodiment of the present invention.

Reference point clouds are extracted from the initial CT scans. The steps involve the calculation of the surface of the facial portion of the head and the formation of the 3D points corresponding to this portion of the face. Examples of the CT point cloud are shown in FIG. 5. These scans used as references are preferred since the PET results are aligned with the initial CT even where motion occurs between the CT and PET, facilitating the accuracy of the attenuation correction.

The stream of PET-frame poses is analyzed to find intervals within which the rms movement of the subject was <0.5 mm for translations and <0.01 radians for rotations about the centered PET-frame origin, and the mean pose for each such interval is computed. Typically, 1 to 20 such intervals are found in a 10-minute frame.

As described above, image reconstruction is performed using the method of Hong et al. (cited above), where motion correction is applied iteratively within the reconstruction, see Eq. 5. The PET list-mode file is histogrammed into sinograms to conform with these intervals using Siemens e7 tools. Data for intervals shorter than 5 s are excluded. For each 10-minute frame, the sinograms, corrected by the mean poses, are reconstructed into a single motion-corrected image as described for Method C in Carson R., Barker W., Liow J., and Johnson C., "Design of a Motion Compensation OSEM List-mode Algorithm for Resolution-Recovery Reconstruction for the HRRT," 2003 IEEE Nuclear Science Symposium, M 16-6, p. 3281, which is incorporated herein in its entirety by specific reference, where motion correction, consisting of a rotation about the centered PET-frame origin and a translation, is implemented within the reconstruction. In this method, the attenuation map is transformed by the mean pose for each interval and applied to the corresponding sinogram.

Two or more cameras (or camera subsystems) may be used. FIG. 5 shows an exemplary embodiment with three camera systems arranged on the inner circumference of a scanner bore. The cameras may be placed at various angles (e.g., 45 degrees apart, as shown, although other angles may be used) around the bore to view the patient from the respective position. The cameras may be evenly or unevenly spaced. The number of cameras may be two, three, or more, and may be placed at any location from which the patient is visible. The functionality of the multiple camera arrangement may be the same as a single camera (i.e., each camera subsystem is treated independently), or data and results from the cameras may be combined to give better accuracy and robustness.

The ability of the present method to accurately correct motion has been tested by placing very low activity (<1 microCurie) point sources on the head and performing the multi-interval motion-corrected reconstruction on a sequence of frames. The rms uncertainty in the decay-corrected coordinates of the sources is a measure of accuracy. Scans have been analyzed where the subject underwent 16 10-minute frames.

Comparison is made with the intrinsic rms accuracy where no motion occurred using a phantom fitted with the same sources.

The tests include using a manikin head, as well as human subject. For the former, the system scanned a manikin head, to which was attached three <1 microCi Na-22 point sources, for 10 minutes. It was translated/rotated at known times (every minute). For human subjects, the system scanned the subjects' heads to which were attached three point sources. Here the times when the subject moved were not pre-established. The pose data are analyzed to identify quiescent intervals in which the pose x, y, and z translations vary less than 0.5 mm rms and the pose Euler angles vary less than 0.01 rms. These intervals are set as variable-length frames when sorting the list-mode data. The list-mode data are sorted into sinograms for these intervals. Short periods of rapid head motion are excluded.

Table 1 below gives the results of a representative manikin run and a representative human run, each approximately 10 minutes in duration, showing the mean and rms motion-corrected coordinates of the point sources referred to. The manikin images are motion corrected with rms uncertainty of approximately 0.5 mm in each dimension. The human images are motion corrected with rms uncertainty of approximately 1 mm in each dimension.

TABLE I

MEANS AND RMS UNCERTAINTIES FOR MOTION CORRECTION FOR A MANIKIN AND A HUMAN RUN, REFERRED TO INITIAL POSITION. IN VOXEL UNITS (2.0362, 2.0362, 2.027) MM.

| Manikin | Xmean | Ymean | Zmean | Xrms | Yrms | Zrms |
|---|---|---|---|---|---|---|
| 1 | 218.08 | 170.28 | 38.22 | 0.30 | 0.21 | 0.17 |
| 2 | 174.35 | 177.98 | 39.87 | 0.17 | 0.26 | 0.17 |
| 3 | 227.88 | 177.85 | 60.17 | 0.28 | 0.25 | 0.12 |
| Human | Xmean | Ymean | Zmean | Xrms | Yrms | Zrms |
| 1 | 188.42 | 169.49 | 38.27 | 0.70 | 0.36 | 0.39 |
| 2 | 246.98 | 179.70 | 44.88 | 0.52 | 0.40 | 0.32 |
| 3 | 181.77 | 171.69 | 61.70 | 0.65 | 0.40 | 0.26 |

Before and after motion-corrected slice images from a human subject are shown in FIGS. 9 and 10. The upper images are fallypride, while the lower images are FDG. As shown, the corrected images have less blur, resulting in sharper images.

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

What is claimed is:

1. A method for subject motion correction in Positron Emission Tomography (PET) scanning, comprising the steps of:
    obtaining, through one or more cameras, images of a head with natural external facial features of a subject undergoing a Positron Emission Tomography (PET) scan;
    determining 3-dimensional measurements of said natural external facial features for each image;
    calculating one or more relative poses of the head of the subject as a function of time;
    determining a time-based image pose sequence based on the relative pose of the head as a function of time;
    obtaining a PET scan file from the PET scan;
    synchronizing the image pose sequence with the PET scan file; and
    for a selected PET image from the PET scan filed, creating a reconstructed PET image by iteratively motion correcting the selected PET image through iteratively applying head motion information from the image pose sequence;
    wherein head motion information is based solely on optical pose tracking of natural external facial features and no fixtures or markers are affixed to the head of the subject.

2. The method of claim 1, wherein there are two or three cameras.

3. The method of claim 1, wherein the one or more cameras are mounted inside a PET scanner bore.

4. The method of claim 1, wherein the images of the head are acquired at 6 to 30 frames per second.

5. The method of claim 1, where in the step of calculating the relative pose of the head of the subject comprises:
    extracting 3-dimensional point-clouds from the images;
    segmenting the 3-dimensional point-clouds from the images to regions based on facial features; and
    aligning the images to a reference head segmentation.

6. The method of claim 1, wherein the step of creating a reconstructed PET image comprises:
    histogramming the PET scan file into sinograms;
    correcting the sinograms by applying one or more the mean poses from the corresponding head motion information from the image pose sequence.

7. The method of claim 6, wherein motion correction comprises a rotation about a center PET-frame origin and a translation.

* * * * *